(12) United States Patent
Pfaffenzeller et al.

(10) Patent No.: US 11,180,137 B2
(45) Date of Patent: Nov. 23, 2021

(54) VEHICLE ENVIRONMENTAL DETECTION SYSTEM FOR PARKING DETECTION

(71) Applicant: VEONEER SWEDEN AB, Vargarda (SE)

(72) Inventors: Christian Pfaffenzeller, Olching (DE); Andreas Schmid, Dachau (DE); Christopher Unverdorben, Munich (DE)

(73) Assignee: VEONEER SWEDEN AB, Vargarda (SE)

( * ) Notice: Subject to any disclaimer, the term of this patent is extended or adjusted under 35 U.S.C. 154(b) by 150 days.

(21) Appl. No.: 16/607,273

(22) PCT Filed: May 4, 2018

(86) PCT No.: PCT/EP2018/061500
§ 371 (c)(1),
(2) Date: Oct. 22, 2019

(87) PCT Pub. No.: WO2018/206426
PCT Pub. Date: Nov. 15, 2018

(65) Prior Publication Data
US 2020/0298833 A1    Sep. 24, 2020

(30) Foreign Application Priority Data
May 9, 2017    (EP) .................................... 17170048

(51) Int. Cl.
*B60W 30/06* (2006.01)
*B60W 60/00* (2020.01)
*G01S 13/931* (2020.01)

(52) U.S. Cl.
CPC ........ *B60W 30/06* (2013.01); *B60W 60/0025* (2020.02); *G01S 13/931* (2013.01);
(Continued)

(58) Field of Classification Search
CPC . B60W 30/06; B60W 60/0025; G01S 13/931; G01S 2013/9314
See application file for complete search history.

(56) References Cited

U.S. PATENT DOCUMENTS

2009/0146842 A1 * 6/2009 Jung ..................... G01S 17/931
340/932.2
2012/0197492 A1 * 8/2012 Schneider ............ B62D 15/028
701/41
(Continued)

FOREIGN PATENT DOCUMENTS

DE    10 2005 045 260 A1    3/2007
DE    10 2013 103 569 A1    10/2013
(Continued)

OTHER PUBLICATIONS

International Search Report of PCT/EP2018/061500 and Written Opinion dated Jul. 18, 2018.

*Primary Examiner* — Michael J Zanelli
(74) *Attorney, Agent, or Firm* — Dickinson Wright PLLC

(57) ABSTRACT

A vehicle environmental detection system (3) in an ego vehicle (1) including at least one control unit arrangement (15) and at least one detector arrangement (4, 7) that is adapted to obtain a plurality of detections (14). The control unit arrangement (15) is adapted to form a cluster (40) of the plurality of detections (14), form a first border line (16) and a second border line (17), where these border lines (16, 17) have mutually longitudinal extensions, and are mutually parallel and define outer borders of the cluster (40) and determine whether the cluster (40) corresponds to a row (13) of corresponding parked vehicles (18a, 18b, 18c, 18d, 18e, 18f, 18g), by the length or longitudinal displacement of, or distance between, the border lines (16, 17).

11 Claims, 7 Drawing Sheets

(52) U.S. Cl.
CPC ..... *B60W 2420/52* (2013.01); *B60W 2554/20* (2020.02); *G01S 2013/9314* (2013.01)

(56) References Cited

U.S. PATENT DOCUMENTS

2018/0120851 A1* 5/2018 Shin ...................... G01S 17/931
2018/0260637 A1* 9/2018 Mayer ................ G06K 9/00812

FOREIGN PATENT DOCUMENTS

| DE | 10 2015 003 666 A1 | 9/2016 |
| EP | 2 557 020 A2 | 2/2013 |
| EP | 2 881 754 A1 | 6/2015 |
| FR | 2 905 765 A1 | 3/2008 |

* cited by examiner

VEHICLE ENVIRONMENTAL DETECTION SYSTEM FOR PARKING DETECTION

CROSS-REFERENCE TO RELATED APPLICATIONS

This application is a 35 U.S.C. § 371 national phase of PCT International Application No. PCT/EP2018/061500, filed May 4, 2018, which claims the benefit of priority under 35 U.S.C. § 119 to European Patent Application No. 17170048.7, filed May 9, 2017, the contents of which are incorporated herein by reference in their entirety.

FIELD OF THE INVENTION

The present disclosure relates to a vehicle environmental detection system arranged to be mounted in an ego vehicle and including at least one detector arrangement and at least one control unit arrangement.

BACKGROUND

Today, one or more radar systems as well as other vehicle environmental detection systems such as for example Lidar (Light detection and ranging) and camera images, are often used in vehicles in order to detect obstacles in the surroundings. Such a radar system is usually arranged to distinguish or resolve single targets from the surroundings by using a Doppler effect in a previously well-known manner.

Apart from use for collision detector arrangements, radars as well as other vehicle environmental detection systems may for example be used for detecting available space for parking spots and assisting when parking a vehicle. When detecting available space for parking, a row of parked cars has to be automatically identified.

A method for assisting a driver of a vehicle during a parking operation is described in EP 2557020. Environmental data characterizing the environment of the vehicle are provided and evaluated with respect to at least one first object in a lateral environment and at least one second object outside the lateral environment.

However, a more efficient and uncomplicated method and device for detecting available space for parking spots is desired.

The object of the present disclosure is thus to provide a vehicle environmental detection system arranged for detecting available space for parking spots in a more efficient and uncomplicated manner than as disclosed in prior art.

The object is achieved by a vehicle environmental detection system arranged to be mounted in an ego vehicle and including at least one detector arrangement and at least one control unit arrangement. The detector arrangement is adapted to obtain a plurality of detections. The control unit arrangement is adapted to form a cluster of the plurality of detections, and to form a first border line and a second border line. These border lines have mutually longitudinal extensions, are mutually parallel and define outer borders of the cluster. The control unit arrangement is further adapted to determine whether the cluster corresponds to a row of corresponding parked vehicles, a parking row, by means of the length and/or longitudinal displacement of, and/or distance between, the border lines.

The object is also achieved by a method for a vehicle environmental detection system in an ego vehicle. The method includes obtaining a plurality of detections, forming a cluster of the plurality of detections, and forming a first border line and a second border line. These border lines have mutually longitudinal extensions, are mutually parallel and define outer borders of the cluster. The method further includes determining whether the cluster corresponds to a row of corresponding parked vehicles, a parking row, using the length and/or longitudinal displacement of, and/or distance between, the border lines.

According to some aspects, if the cluster has been determined to constitute a row of corresponding parked vehicles in the parking row, the control unit arrangement is adapted to determine how at least one connection line, arranged to connect the border lines, is running with respect to the border lines, and to determine a shortest distance between the border lines. The control unit arrangement is then further adapted to compare the distance with a predetermined vehicle width and a predetermined vehicle length, and to determine how the vehicles in the parking row are oriented with respect to a movement direction of the vehicle environmental detection system.

According to some aspects, if the cluster has been determined to constitute a row of corresponding parked vehicles in the parking row, the control unit arrangement is adapted to determine gaps in detections between the two border lines in order to determine available parking spots.

Other aspects of the present disclosure are disclosed in this description.

A number of advantages are obtained by means of the present disclosure. For example:

Parking rows are easily detected even though partly covered or merged with road borders like close buildings.

No reference is needed, i.e. parking rows can be detected on free fields or in free space.

Detection is independent of the ego vehicle's movement direction.

Detection is independent of the number of occupied parking spots.

Detection is independent of the ego vehicle's velocity.

Provides main characteristics of a parking row, i.e. orientation of the parked cars.

Enables a fast, uncomplicated and robust detection.

BRIEF DESCRIPTION OF THE DRAWINGS

The present disclosure will now be described more in detail with reference to the appended drawings, where.

DETAILED DESCRIPTION

Figure 1:
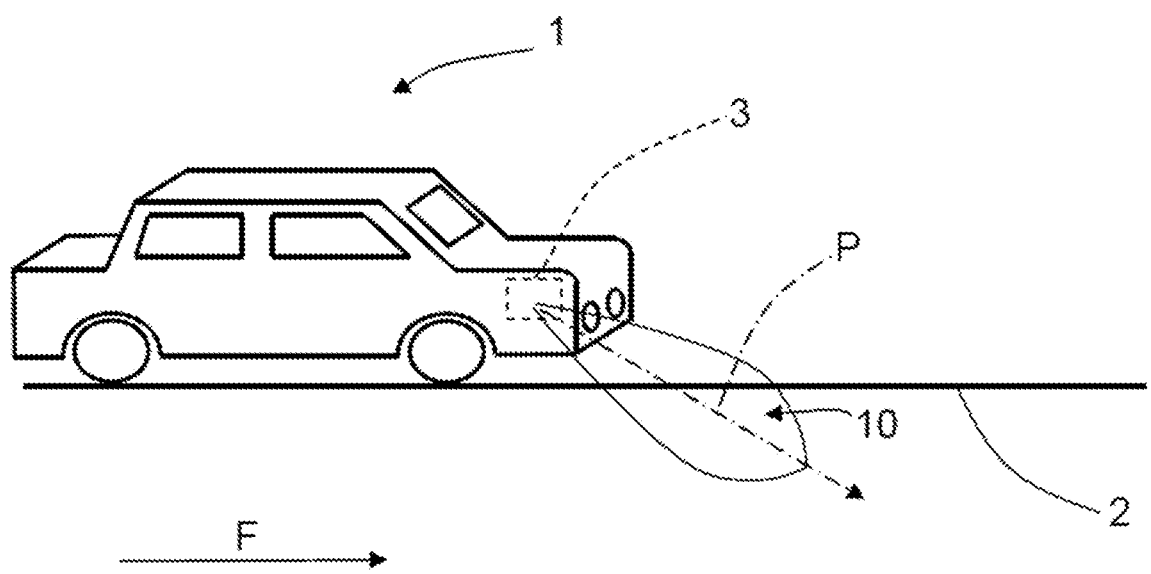
FIG. 1 shows a schematic side view of a vehicle.

FIG. 1 schematically shows a side view an ego vehicle 1 that runs on a road 2 in a movement direction F, where the vehicle 1 includes a vehicle radar system 3 which is arranged to distinguish and/or resolve single targets from the surroundings by using a Doppler effect together with analysis of received reflected signals in a previously well-known manner, i.e. successive echoes from the same point are superimposed and identified by means of Doppler effect. The radar system is positioned on the right-hand side of the vehicle, and has a main field of view 10 that is aimed in a pointing direction P that extends more or less perpendicular to the movement direction F. According to some aspects, the main field of view 10 has an azimuth angel of about 140°.

Figure 2:
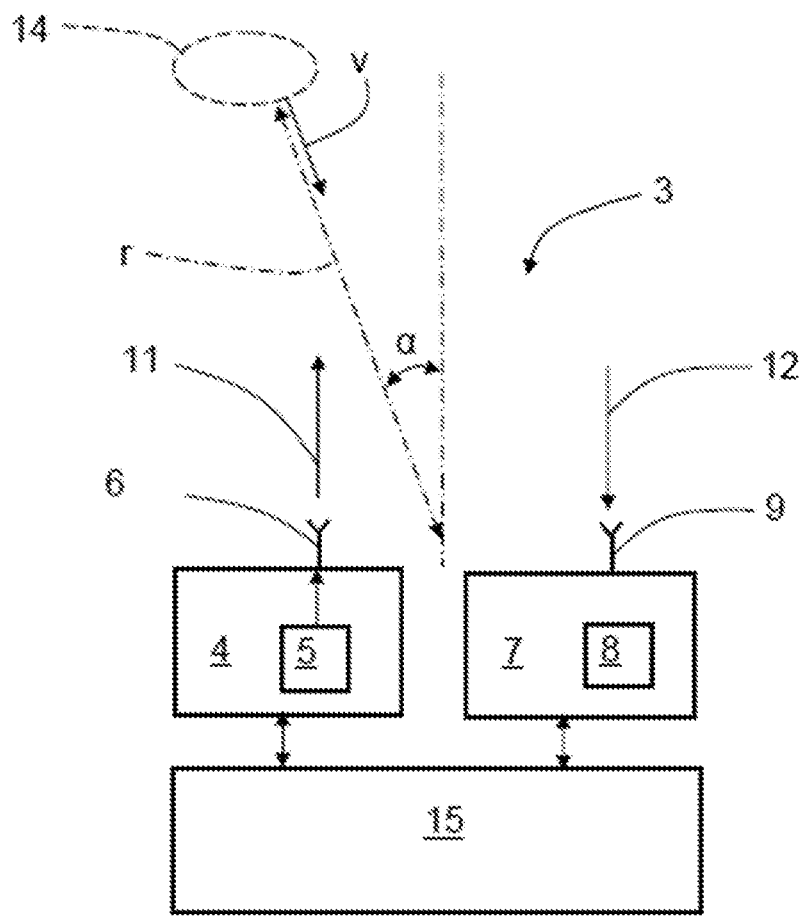
FIG. 2 shows a simplified schematic of a radar system according to the present disclosure.

With reference also to FIG. 2, the radar system 3 includes a transmitter arrangement 4 which in turn includes a signal generator 5 and a transmitter antenna arrangement 6. The vehicle radar system 3 further includes a receiver arrangement 7, which in turn includes a receiver 8 and a receiver antenna arrangement 9.

Transmitted signals 11 are reflected, and the reflected signals 12 are received by the receiver 8 via the receiver antenna arrangement 9. When in use, the transmitter antenna arrangement 6 sends a signal in the pointing direction P when the ego vehicle 1 runs past a parking row 13, the radar system 3 having the certain field of view 10 that passes along the parking row 13. The radar system 3 then receives echoes of the transmitted signals 11 by use of the receiver antenna arrangement 8. The field of view 10 corresponds to the beamwidth of the antenna arrangements 6, 9 in a previously known manner.

Figure 3:
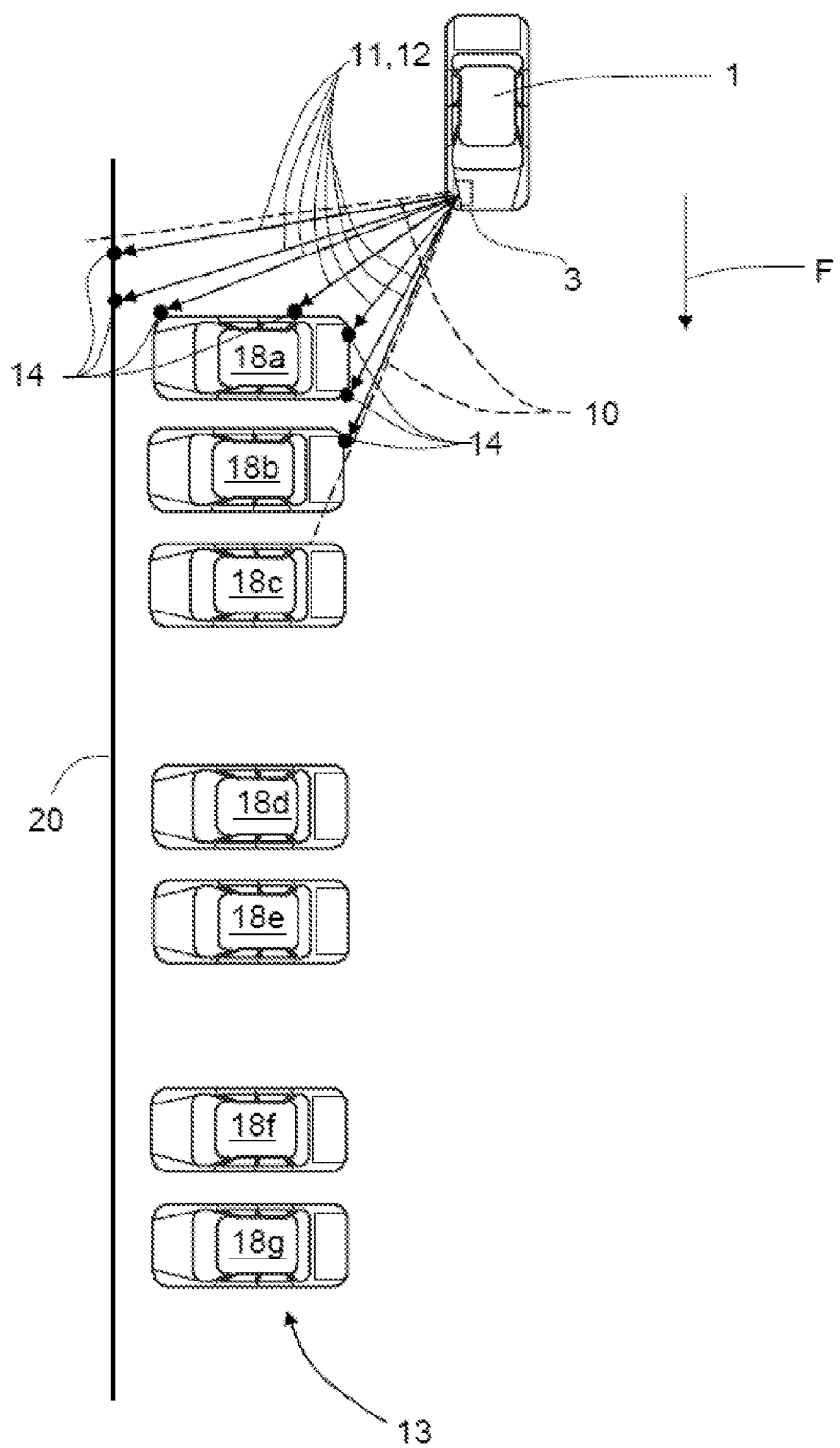
FIG. 3 shows a schematic top view of a vehicle passing a parking row according to a first example.

With reference also to FIG. 3, the above is repeated as many times as necessary at a predetermined frequency band, while the ego vehicle 1 moves in the movement direction F, to obtain a plurality of radar detections 14.

The receiver arrangement 7 provides filtered IF (Intermediate Frequency) signals converted to digital signals to a control unit arrangement 15 including a DSP (Digital Signal Processor) functionality that is adapted for radar signal processing by use of a first FFT (Fast Fourier Transform) to convert the digital signals to a range domain, and a second FFT to combine the results from successive radar cycles into the Doppler domain in a previously well-known manner.

The control unit arrangement 15 is thus arranged to provide azimuth angles of possible target objects by simultaneously sampling and analyzing phase and amplitude of the received signals 12. Each radar detection has a certain detected azimuth angle α, distance r and radial velocity v as schematically indicated in FIG. 2.

Figure 4:
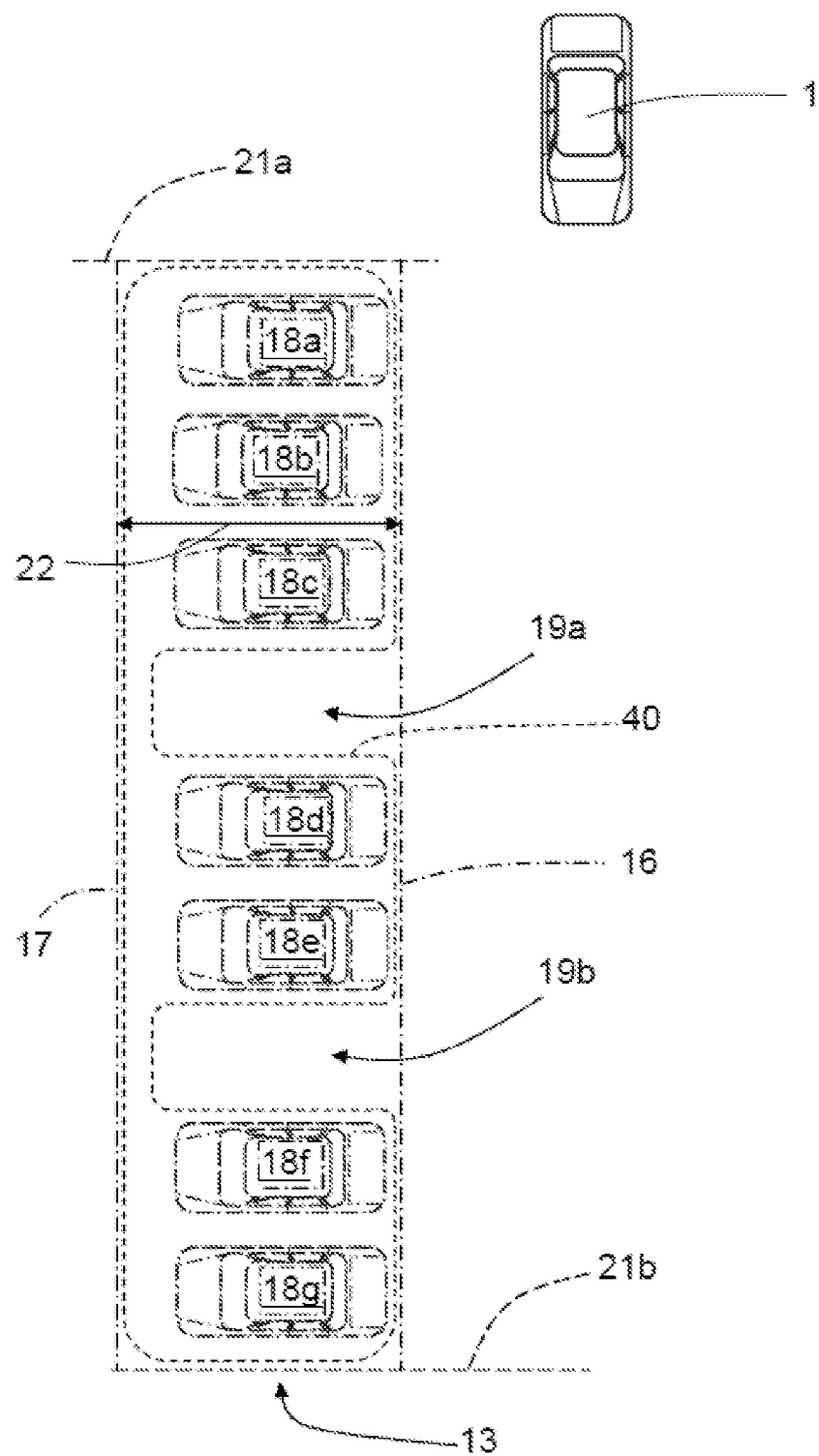
FIG. 4 shows a schematic top view of radar detections being grouped into a cluster.

According to the present disclosure, with reference also to FIG. 4, the control unit arrangement 15 also includes a clustering functionality and is adapted to group the radar detections 14 into a cluster 40 in a clustering procedure. Generally, a cluster corresponds to a structure such as a parking row, or in which a parking row 13 is included; e.g. a wall of a house and/or a parallel existing parking row.

By use of the formed cluster 40, the control unit arrangement 15 is further adapted to form a first border line 16 and a second border line 17, where these border lines 16, 17 have mutually longitudinal extensions, are mutually parallel and define outer borders of the formed cluster 40. Considering the relation between the border lines 16, 17, the control unit arrangement 15 is adapted to determine whether the formed cluster 40 includes a row 13 of corresponding parked vehicles 18a, 18b, 18c, 18d, 18e, 18f, 18g, a parking row 13, and how these vehicles 18a, 18b, 18c, 18d, 18e, 18f, 18g are parked, i.e. the characteristics of the parking row 13. This is according to some aspects determined by analysis of length and/or longitudinal displacement of, and/or distance between the border lines 16, and how these are related. This will be described more in detail in the following.

The control unit arrangement 15 is adapted to form the cluster 40 of known algorithms, e.g. a DBSCAN (Density-based spatial clustering of applications with noise) method, and determine the border lines 16, 17 by use of further known algorithms, e.g. Least squares Fit, RANSAC (Random sample consensus) or Hough transform.

The first border line 16 is a representation of radar detections caused by parked vehicles 18a, 18b, 18c, 18d, 18e, 18f, 18g in the parking row 13. The second border line 17 is a representation of radar detections caused by the limitation of the parking row, e.g. environmental objects such as curb, wall 20, hedgerow etc. or rims and/or other vehicle parts at the backside of the parked vehicles 18a, 18b, 18c, 18d, 18e, 18f, 18g in the parking row 13.

In a further step, the control unit arrangement 15 is adapted to determine gaps 19a, 19b in detections between the two border lines 16, 17 in order to determine available parking row slots for the ego vehicle 1, where the orientation of the parking row 13 and distance to the ego car 1 are known.

The control unit arrangement 15 is also adapted to determine the characteristics of the detected parking row by analyzing the border lines 16, 17.

The cluster 40 according to the first example in FIG. 4 has a first border line 16 and a second border line 17 that run parallel and are connected by a first connecting line 21a and a second connecting line 21b, which connecting lines 21a, 21b run perpendicular to the border lines 16, 17. By also determining a shortest distance 22 between the border lines 16, 17 that exceeds a typical predetermined length of a vehicle, it can be determined that this parking row includes parked vehicles 18a, 18b, 18c, 18d, 18e, 18f, 18g that are parked in a straight manner, perpendicular to the border lines 16, 17.

Figure 5:
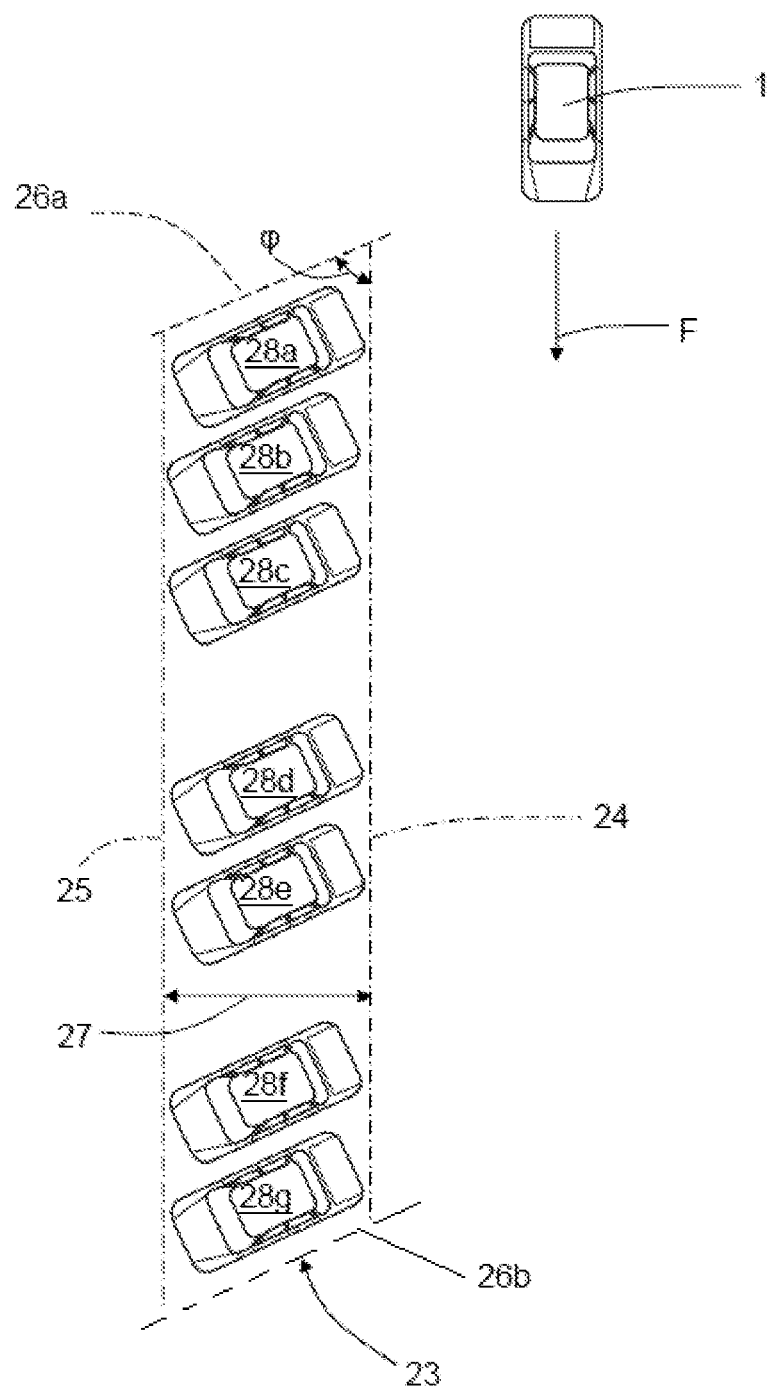
FIG. 5 shows a simplified schematic top view of a vehicle passing a parking row according to a second example.

A parking row 23 according to second example, with reference to FIG. 5, has a first border line 24 and a second border line 25 that run parallel and are connected by a first connecting line 26a and a second connecting line 26b. The first connecting line 26a runs at a first angle φ to the border line 24 closest to the ego vehicle 1 that falls below 90°. The second connecting line 26b runs at a second angle θ to the border line 24 closest to the ego vehicle 1 that exceeds 90°. It is thus determined that these angles φ, θ differ from 90°.

By also determining a shortest distance 27 between the border lines 24, 25 that exceeds a typical predetermined length of a vehicle, it can be determined that this parking row includes parked vehicles 28a, 28b, 28c, 28d, 28e, 28f, 28g that are parked in a slanted manner, at an angle to the border lines 16, 17 that falls below 90° or exceeds 90° depending on from which direction the ego vehicle 1 approaches the cluster 40.

Figure 6:
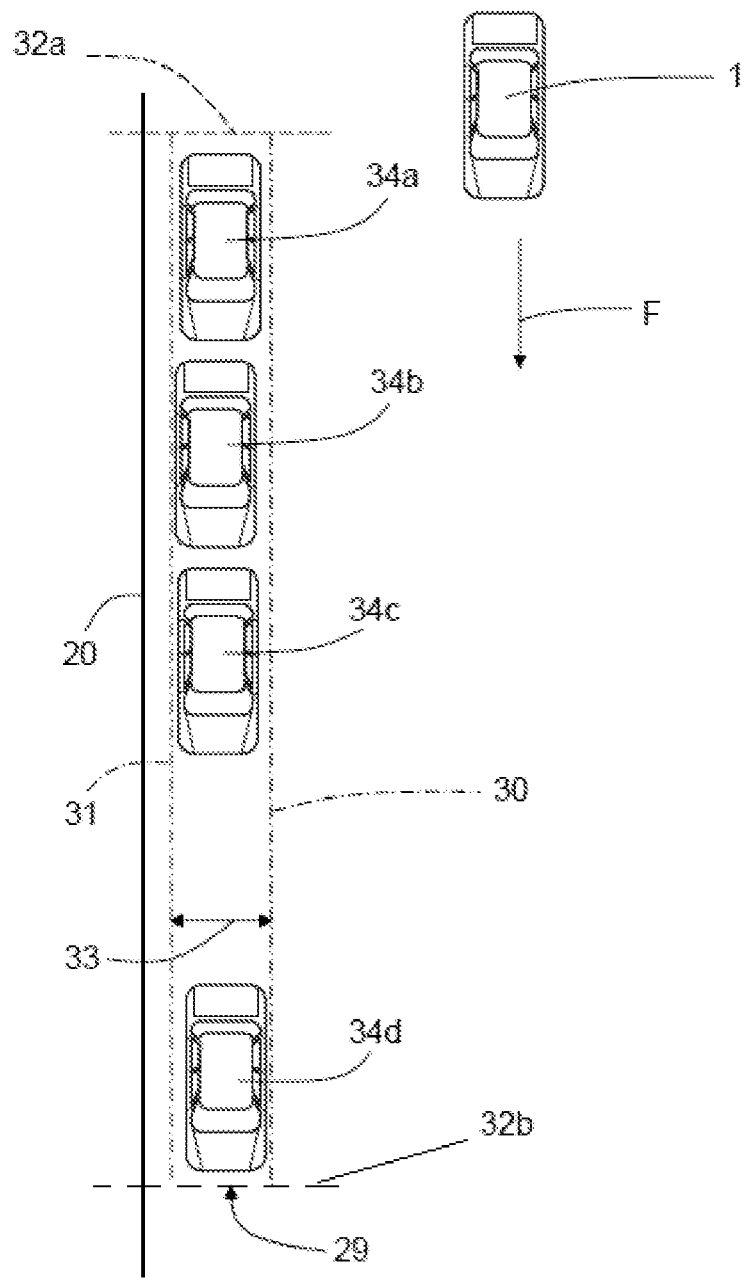
FIG. 6 shows a simplified schematic top view of a vehicle passing a parking row according to a third example.

A parking row 29 according to third example, with reference to FIG. 6, has a first border line 30 and a second border line 31 that run parallel and are connected by a first connecting line 32a and a second connecting line 32b, which connecting lines 32a, 32b run perpendicular to the border lines 30, 31. By also determining a shortest distance 33 between the border lines 30, 31 that corresponds to a typical predetermined width of a vehicle, it can be determined that this parking row includes parked vehicles 34a, 34b, 34c, 34d that are parked in a parallel manner, parallel to the border lines 30, 31.

By means of this approach, it is determined if it is a row of parked vehicles that is detected, and if that is the case, the characteristics of the parking row. Then it is determined whether there are any available parking spots.

For reasons of clarity, only a few radar detections 14 are shown in FIG. 3, and no radar detections are shown in FIG. 5 and FIG. 6. Of course, practically, there is a multitude of radar detections. According to some aspects, the detections from a radar cycle are saved in a detection memory to the next radar cycle in order to provide a better representation of the environment.

Figure 7:
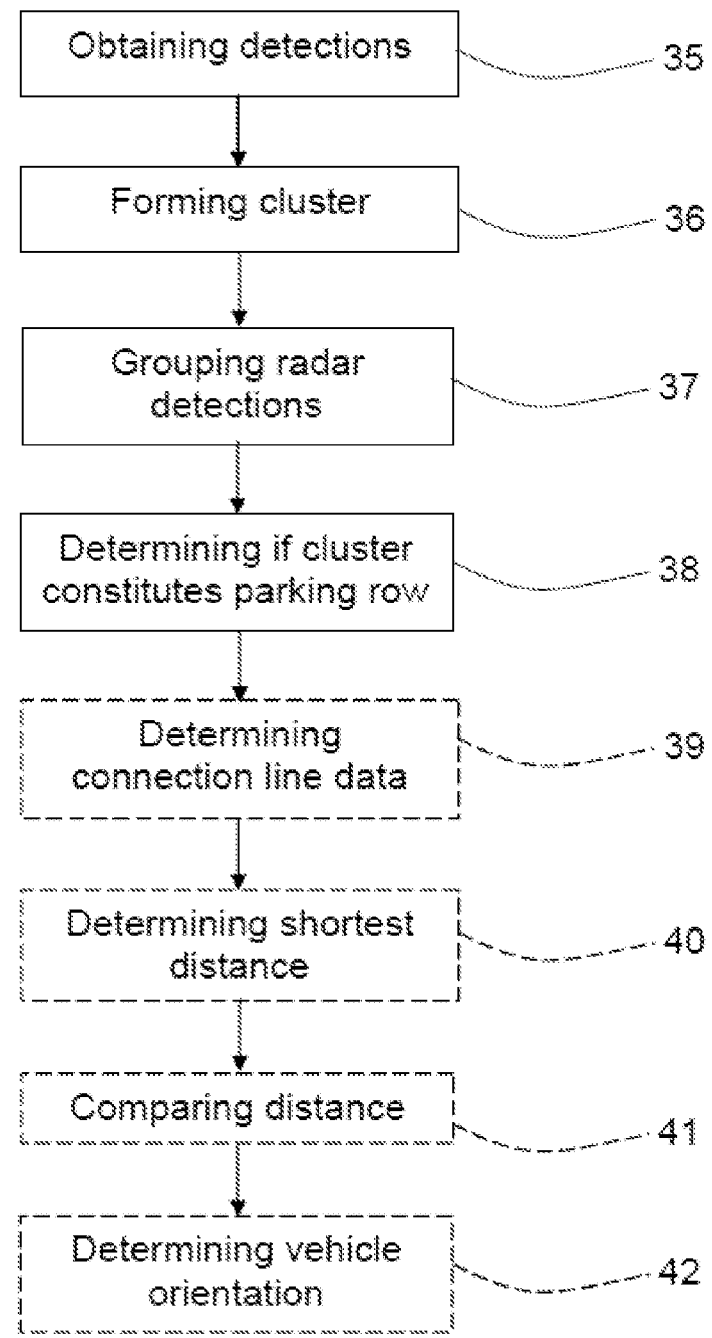
FIG. 7 shows a flowchart for a method according to the present disclosure.

With reference to FIG. 7, the present disclosure also relates to a method for a vehicle environmental detection system 3 in an ego vehicle 1. The method includes the steps of:

Step 35: Obtaining a plurality of detections 14.

Step 36: Forming a cluster 40 of the plurality of detections 14.

Step 37: Forming a first border line 16, 24, 30 and a second border line 17, 25, 31, where these border lines 16, 24, 30 and 17, 25, 31 have mutually longitudinal extensions, are mutually parallel and define outer borders of the cluster 40.

Step 38: Determining whether the cluster 40 corresponds to a row 13 of corresponding parked vehicles 18a, 18b, 18c, 18d, 18e, 18f, 18g, a parking row 13, using the length and/or longitudinal displacement of, and/or distance between, the border lines 16, 24, 30 and 17, 25, 31.

According to some aspects of embodiments of the present invention, if the cluster 40 has been determined to constitute a row 13 of corresponding parked vehicles 18a, 18b, 18c, 18d, 18e, 18f, 18g; 28a, 28b, 28c, 28d, 28e, 28f, 28g; 34a, 34b, 34c, 34d in the parking row 13, 23, 29, the method includes the steps of:

Step 39: Determining how at least one connection line 21a, 21b, 26a, 26b, 32a and 32b, arranged to connect the border lines 16, 17; 24, 25; 30, 31, is running with respect to the border lines 16, 17; 24, 25; 30, 31.

Step 40: Determining a shortest distance 22, 27, 33 between the border lines 16, 17; 24, 25; 30, 31.

Step 41: Comparing the distance with a predetermined vehicle width and a predetermined vehicle length.

Step 42: Determining how the vehicles 18a, 18b, 18c, 18d, 18e, 18f, 18g; 28a, 28b, 28c, 28d, 28e, 28f, 28g; 34a, 34b, 34c, 34d in the parking row 13, 23, 29 are oriented with respect to a movement direction F of the vehicle environmental detection system 3.

The present disclosure is not limited to the examples above, but may vary freely within the scope of the appended claims. For example, the radar system may be implemented in any type of vehicle such as cars, trucks and buses as well as boats and aircraft.

All drawings are simplified, only showing parts that are considered relevant for an adequate description of the present disclosure. It is understood that the general design of radar systems of this kind is well-known in the art.

The constitution of the antennas employed in the transmitter antenna arrangement 6 and receiver antenna arrangement 9 may be of any suitable design, such as slot antennas of patch antennas. The transmitter antenna arrangement 6 and receiver antenna arrangement 9 may be combined in one antenna arrangement that is arranged for both transmission and reception by means of, for example, time division.

Terms such as perpendicular and parallel are not to be interpreted as mathematically exact, but within what is practical in the present context. The border lines have mutually longitudinal extensions and are mutually parallel, but of course smaller deviations can occur due to practical reasons.

According to some aspects, the control unit arrangement 15, includes one or several separate control units that are arranged together or in a distributed manner.

According to some aspects, the ego vehicle 1 does not have to be moving, but can be motionless.

According to some aspects, the vehicle radar system 3 can be constituted by any type of suitable vehicle environmental detection system such as for example Lidar. Such a vehicle environmental detection system 3 can includes at least one detector arrangement 4, 7 at any suitable corresponding position at the vehicle, and at least one control unit arrangement 15. The detector arrangement 4, 7 is adapted to obtain a plurality of detections 14.

The movement direction F can be directed in a forward movement direction as well as in a rearward movement direction.

According to some aspects, the ego vehicle 1 can approach the parking row from any angle; each approaching angle is possible as long as the parking row is in the field of view of the radar system 3 or in a detection memory.

Generally, the present disclosure relates to a vehicle environmental detection system 3 arranged to be mounted in an ego vehicle 1 and including at least one detector arrangement 4, 7 and at least one control unit arrangement 15, where the detector arrangement 4, 7 is adapted to obtain a plurality of detections 14. The control unit arrangement 15 is adapted to:

Form a cluster 40 of the plurality of detections 14;

Form a first border line 16, 24, 30 and a second border line 17, 25, 31, where these border lines 16, 24, 30 and 17, 25 and 31 have mutually longitudinal extensions, are mutually parallel and define outer borders of the cluster 40; and to Determine whether the cluster 40 corresponds to a row 13, 23, 29 of corresponding parked vehicles 18a, 18b, 18c, 18d, 18e, 18f, 18g, a parking row 13, 23, 29, by means of the length and/or longitudinal displacement of, and/or distance between, the border lines 16, 24, 30 and 17, 25, 31.

According to some aspects, the vehicle environmental detection system is constituted by a radar system 3, where the detector arrangement includes a transmitter arrangement 4 and a receiver arrangement 7, where the transmitter arrangement 4 includes a signal generator 5 and a transmitter antenna arrangement 6 arranged for transmitting signals 11, and where the receiver arrangement 7 includes a receiver 8 and a receiver antenna arrangement 9 arranged for receiving reflected signals 12.

According to some aspects, if the cluster 40 has been determined to constitute a row 13, 23, 29 of corresponding parked vehicles 18a, 18b, 18c, 18d, 18e, 18f, 18g; 28a, 28b, 28c, 28d, 28e, 28f, 28g; 34a, 34b, 34c, 34d in the parking row 13, 23, 29, the control unit arrangement 15 is adapted to:

Determine how at least one connection line 21a, 21b, 26a, 26b, 32a, 32b, arranged to connect the border lines 16, 17; 24, 25; 30, 31, is running with respect to the border lines 16, 17; 24, 25; 30, 31;

Determine a shortest distance 22, 27, 33 between the border lines 16, 24, 30 and 17, 25, 31;

Compare the distance with a predetermined vehicle width and a predetermined vehicle length; and to Determine how the vehicles 18a, 18b, 18c, 18d, 18e, 18f, 18g; 28a, 28b, 28c, 28d, 28e, 28f, 28g; 34a, 34b, 34c, 34d in the parking row 13, 23, 29 are oriented with respect to a movement direction F of the vehicle environmental detection system 3.

According to some aspects of embodiments of the present invention, if the cluster 40 has been determined to constitute a row 13, 23, 29 of corresponding parked vehicles 18a, 18b, 18c, 18d, 18e, 18f, 18g; 28a, 28b, 28c, 28d, 28e, 28f, 28g; 34a, 34b, 34c, 34d in the parking row 13, 23, 29, the control unit arrangement 15 is adapted to determine gaps 19*a*, 19*b* in detections between the two border lines 16, 24, 30 and 17, 25, 31 in order to determine available parking spots.

Generally, the present disclosure also relates to a method for a vehicle environmental detection system 3 in an ego vehicle 1, where the method includes the steps of:

Step 35: obtaining a plurality of detections 14.

Step 36: forming a cluster 40 of the plurality of detections 14;

Step 37: forming a first border line 16, 24, 30 and a second border line 17, 25, 31, where these border lines have mutually longitudinal extensions, are mutually parallel and define outer borders of the cluster 40; and Step 38: determining whether the cluster 40 corresponds to a row 13, 23, 29 of corresponding parked vehicles 18*a*, 18*b*, 18*c*, 18*d*, 18*e*, 18*f*, 18*g*, a parking row 13, using the length and/or longitudinal displacement of, and/or distance between, the border lines 16, 24, 30 and 17, 25, 31.

According to some aspects, if the cluster 40 has been determined to constitute a row 13, 25, 31 of corresponding parked vehicles 18*a*, 18*b*, 18*c*, 18*d*, 18*e*, 18*f*, 18*g*; 28*a*, 28*b*, 28*c*, 28*d*, 28*e*, 28*f*, 28*g*; 34*a*, 34*b*, 34*c*, 34*d* in the parking row 13, 23, 29, the method includes the steps of:

Step 39: determining how at least one connection line 21*a*, 21*b*, 26*a*, 26*b*, 32*a*, 32*b*, arranged to connect the border lines 16, 24, 30, is running with respect to the border lines 17, 25, 31;

Step 40: determining a shortest distance 22, 27, 33 between the border lines 16, 24, 30 and 17, 25, 31;

Step 41: comparing the distance with a predetermined vehicle width and a predetermined vehicle length; and Step 42: determining how the vehicles 18*a*, 18*b*, 18*c*, 18*d*, 18*e*, 18*f*, 18*g*; 28*a*, 28*b*, 28*c*, 28*d*, 28*e*, 28*f*, 28*g*; 34*a*, 34*b*, 34*c*, 34*d* in the parking row 13, 23, 29 are oriented with respect to a movement direction F of the vehicle environmental detection system 3.

According to some aspects of embodiments of the present invention, if the cluster 40 has been determined to constitute a row 13, 23, 29 of corresponding parked vehicles 18*a*, 18*b*, 18*c*, 18*d*, 18*e*, 18*f*, 18*g*; 28*a*, 28*b*, 28*c*, 28*d*, 28*e*, 28*f*, 28*g*; 34*a*, 34*b*, 34*c*, 34*d* in the parking row 13, 23, 29, the method includes determining gaps 19*a*, 19*b* in detections between the two border lines 16, 24, 30 and 17, 25, 31 in order to determine available parking spots.

While the above description constitutes the preferred embodiment of the present invention, it will be appreciated that the invention is susceptible to modification, variation and change without departing from the proper scope and fair meaning of the accompanying claims.

The invention claimed is:

1. A vehicle environmental detection system arranged to be mounted in an ego vehicle comprising, at least one detector arrangement and at least one control unit arrangement, where the detector arrangement is adapted to obtain a plurality of detections, the control unit arrangement is adapted to:

form a cluster of the plurality of detections;

form a first border line and a second border line, where the first and second border lines have mutually longitudinal extensions, are mutually parallel and define outer borders of the cluster; and to determine whether the cluster corresponds to a row of corresponding parked vehicles, by a length or a longitudinal displacement or a distance between the border lines.

2. The vehicle environmental detection system according to claim 1 wherein, the vehicle environmental detection system is further comprising, a radar system, where the detector arrangement comprises a transmitter arrangement and a receiver arrangement, where the transmitter arrangement includes a signal generator and a transmitter antenna arrangement arranged for transmitting signals, and where the receiver arrangement includes a receiver and a receiver antenna arrangement for receiving reflected signals.

3. The vehicle environmental detection system according to claim 1 further comprising, that if the cluster has been determined to constitute the row of corresponding parked vehicles in the parking row, the control unit arrangement is adapted to:

determine how at least one connection line, arranged to connect the first and second border lines, is running with respect to another of the first and second border lines;

determine a shortest distance between the first and second border lines;

compare the shortest distance with a predetermined vehicle width or a predetermined vehicle length; and to determine how the parked vehicles in the parking row are oriented with respect to a movement direction of the vehicle environmental detection system.

4. The vehicle environmental detection system according to claim 3 further comprising the control arrangement further adapted to determine an angle formed between the at least one connection line and at least one of the first and second border lines.

5. The vehicle environmental detection system according to claim 1 further comprising comparing the shortest distance with the predetermined width and the predetermined vehicle length.

6. The vehicle environmental detection system according to claim 1 further comprising, that if the cluster has been determined to constitute the row of corresponding parked vehicles in a parking row, the control unit arrangement is adapted to determine gaps in detections between the first and second border lines in order to determine one or more available parking spots.

7. A method for a vehicle environmental detection system in an ego vehicle, where the method comprises the steps of:

obtaining a plurality of detections;

forming a cluster of the plurality of detections;

forming a first border line and a second border line, where the first and second border lines have mutually longitudinal extensions, are mutually parallel and define outer borders of the cluster; and determining whether the cluster corresponds to a row of corresponding parked vehicles, using a length or a longitudinal displacement or a distance between the first and second border lines.

8. The method according to claim 7 further comprising, that the if the cluster has been determined to constitute the row of the corresponding parked vehicles in a parking row, the method further comprises:

determining how at least one connection line, arranged to connect one of the first and second border lines, is running with respect to another of the first and second border lines;

determining a shortest distance between the first and second border lines;

comparing the shortest distance with a predetermined vehicle width or a predetermined vehicle length; and determining how the vehicles in the parking row are oriented with respect to a movement direction of the vehicle environmental detection system.

9. The method according to claim 8 further comprising the step of determining an angle formed between the at least one connection line and at least one of the first and the second border lines.

10. The method according to claim 8 further comprising comparing the shortest distance with the predetermined vehicle width and the predetermined vehicle length.

11. The method according to claim 7 further comprising, that if the cluster has been determined to constitute the row of the corresponding parked vehicles in a parking row, the method comprises determining gaps in the detections between the first and second border lines in order to determine one or more available parking spots.

* * * * *